United States Patent [19]
Dunn et al.

[11] Patent Number: 5,673,255
[45] Date of Patent: Sep. 30, 1997

[54] APPARATUS FOR PROVIDING SERVICE TO TELEPHONE SUBSCRIBERS CONNECTED TO A REMOTE TERMINAL FROM MULTIPLE TELEPHONE SERVICE PROVIDERS

[75] Inventors: James Patrick Dunn, Sandwich; William Brohmer Paulson, Naperville; Carl Robert Posthuma, Wheaton; Dorothy Voytko Stanley, Warrenville, all of Ill.

[73] Assignee: Lucent Technologies Inc., Murray Hill, N.J.

[21] Appl. No.: 580,240

[22] Filed: Dec. 28, 1995

[51] Int. Cl.$^6$ ................................ H04Q 1/20; H04Q 3/58
[52] U.S. Cl. ..................... 370/244; 370/360; 370/467; 379/14
[58] Field of Search .................... 370/241, 242, 370/244, 247, 357, 360, 373, 377, 384, 378, 466, 467, 522, 525; 379/27.9, 12, 14, 29, 15, 207, 219, 229, 230, 231, 232

[56] References Cited

U.S. PATENT DOCUMENTS 5,119,366  6/1992  Ardon et al. .................... 370/378
5,574,783  11/1996  Dunn .............................. 379/230

*Primary Examiner*—Douglas W. Olms
*Assistant Examiner*—Chau T. Nguyen
*Attorney, Agent, or Firm*—Michael B. Johannesen

[57] ABSTRACT

An unbundling apparatus to permit competitive access providers access to telephone lines connected to a remote terminal, and the ability to control and test such lines. Such unbundling apparatus includes a switch fabric, a command module, and a testing module. The switch fabric provides all voice channel connections between all switches and the remote terminal and grooms the control channels. Control messages are switched into the command module, which performs any protocol translations necessary. All commands from switches are then multiplexed and sent back to the switch fabric, which routes them to the original command channel to the remote terminal. Control messages from the remote terminal are demultiplexed, translated (if necessary) and sent to the switch fabric for delivery to the appropriate switch. Testing of lines is also provided to all competitive service providers.

12 Claims, 14 Drawing Sheets

APPARATUS FOR PROVIDING SERVICE TO TELEPHONE SUBSCRIBERS CONNECTED TO A REMOTE TERMINAL FROM MULTIPLE TELEPHONE SERVICE PROVIDERS

TECHNICAL FIELD

This invention relates to the field of providing competitive access telephone service and, more specifically, to providing a system which allows a plurality of local service provider switches to connect to one or more remote terminals, so that individual subscribers connected to the remote terminal may select among the service providers.

BACKGROUND OF THE INVENTION

Because of increasing pressure to deregulate the local telephone market, the incumbent local telephone service provider (the local exchange carrier or "LEC") is being required to unbundle telephone services and resources that serve local lines to provide competition among the LEC and competitive access telephone service providers. One area of such unbundling that is particularly complicated occurs when consumer lines are served by a remote terminal (e.g., subscriber loop carder), instead of a direct connection to a switching office. (For purposes of this document, it is intended that the term subscriber loop carder or "SLC" covers what are known in the art as subscriber loop carders and digital loop carriers.) Subscriber loop carriers (SLCs) provide primary connection of subscriber telephones to the public switched telephone network (PSTN) for clusters of subscribers. There are many thousands of SLCs in use in both the United States and internationally. These SLCs are commonly used to provide economical telephone service in rural and suburban communities where direct connection to the telephone switching office for each individual subscriber requires expensive outside plant equipment, such as a large number of long wire pairs, amplifiers, etc. However, SLCs are now also used in urban areas, such as high height and high density housing units, to provide the LEC with a more convenient arrangement of resources. Thus, many LECs are using SLCs where they used to use copper-pair wire to reduce the cost of physical maintenance of the outside plant.

FIG. 1 illustrates a typical prior art SLC 100. SLC 100 is connected to a plurality of subscriber telephones (not shown) in houses 102, 104, and 106 via lines 108–112 respectively (each house may have a plurality of line, such as houses 104 and 106). SLC 100 comprises ports and logic in a switch in a central office 114 and a field or remote terminal portion 116. The remote terminal 116 of SLC 100 is housed on a pedestal or enclosure in proximity to the subscribers which it serves. The subscriber lines (copper pair or "tip and ring," as known in the art), which may carry voice or data, are connected to remote terminal 116 of SLC 100 at a plurality of line cards 118, as known in the art. The SLC line cards 118 are generally similar to line cards found in any prior art switching system and provide the BORSHT functionality of telephone service (battery, over voltage, ringing, supervision, hybrid, and testing, as is known in the art). These line cards are plugged into an optical network unit (ONU) 120, which receives and transmits analog signals to and from the line card, performs analog/digital translations and prepares the signals for transmission to the central office 114 by embedding the signal into a transmission protocol. ONU 120 is controlled by control unit 122. Control unit 122 uses a dedicated channel to switch 114 in order to send control or command messages, such as reporting an off-hook or switch hook flash condition and receives control messages, to cause ringing, for example, and other functions known in the art.

In this embodiment of FIG. 1, a host switch 134 at the LEG central office 114 is directly connected to the optical network via a plurality of network facilities 128–132, which carry multiplexed signals from ONU120 on 24 channels each (such facilities are commonly DS1s). In this exemplary prior art embodiment, network facilities 128–132 are connected directly to host switch 134. Control messages and digitally encoded voice (or other user data) is embedded in a digital stream and transmitted over facilities 128–132 in a standard protocol, such as TR303 or TR08, as known in the art. Host switch 134 is also connected to public switch telephone network 136. In this manner, this LEG switch-remote terminal pair can provide telephone service for a plurality of customers.

Turning now to FIG. 2, a further prior art SLC system is shown which illustrates a remote terminal 116 connected to host switch 134 by means of host digital terminal 124. Host digital terminal 124 generally use a proprietary protocol 131 for conveying information between host digital terminal 124 and remote terminal 116 over facilities 128-132. Host digital terminal 124 is generally located at the LEC switch 114 and is connected to a host switch 134. Host digital terminal 124 converts the proprietary protocol to the standard TR303 or TR08 protocol for delivery to host switch 134, and sends such signals over buses 133. Host switch 134 can then connect calls between SLC 100 and the public switch telephone network (PSTN) 136.

In most remote terminal arrangements, there is a dedicated control channel 138 for convening commands between remote terminal 116 and either the host switch 134 or the host digital terminal 138. This control channel 138 is used to provide supervision, set up phone calls, etc., as is known in the art and described in the above reference. A test bus 142 is also provided between the host switch 134, host digital terminal 124 (if so equipped), and remote terminal 116. Test bus 142 is used by craft at host switch 134 (or via a remote link to host switch 134, not shown but well known in the art) to test host digital terminal 124 (if so equipped), remote terminal 116 and lines, such as 108–112, as is known in the art.

In order to provide a competitive access provider switch, such as 140, with access to a subscriber line served by a remote terminal, there are several resources that must be "unbundled." First, a plurality of voice channels (trunks or DS1s) between the LEC switch and the remote terminal must somehow be connected to the competitive access provider switch 140. Second, the competitive access provider switch 140 must have some access to control channel 138. Finally, there must be test access from the competitive access provider switch to remote terminal 116 for testing.

In the prior art switch of FIG. 1, there are many voice channels (DS1s) which can be unbundled and redirected to the competitive access provider switch by physically removing one or more trunks from the switch and physically attaching them to a similar facility (which uses TR 303 or TR08 protocol, or a modified version thereof) at the competitive access provider switch 140 (provided the appropriate functionality is present in the switch). Furthermore, test access to lines 108–112 can be achieved using a variety of telemetry arrangements on the market today. Remote terminal 116, however, can only be tested using testing and measuring devices at host switch 134.

However, since there is only one control channel 138 and one test bus 142 per remote terminal 116, it is necessary that these facilities be shared with the competitive access provider switch 140. Such sharing is currently impossible because control channel 138 is generally integrated into the switching equipment 134 of the original LEC switching system 114, and is not designed for access by other switches. Also in the scenario of FIG. 2, the protocol used to control the remote terminal is proprietary, and only the switches made by a given manufacturer are capable of communicating with the control unit of the remote terminal. Competitive access service cannot be offered without the use of the proprietary control channel because it is used to report off-hook and on-hook conditions, alarms, etc., from the remote terminal for every line, and to set up call to every line connected to the remote terminal.

Therefore, a problem in the art is that there is no way to unbundle the control channel and test facilities from a monopoly telephone service provider so that a competitive access telephone service provider may control and test selected lines in a remote terminal on a comparably efficient basis with the original LEC switch.

SUMMARY OF THE INVENTION

This problem is solved and a technical advance is achieved in the art by a system and method that permits competitive access providers the ability to provide service to subscriber lines connected to a remote terminal, and the ability to control and test such lines. According to this invention, a new unbundling apparatus is inserted between a host switch and a remote terminal in order to provide access to voice channels, maintenance channels, and the control channel for competitive access providers. This remote terminal unbundling apparatus includes a switch fabric, a command module, and a testing module. In configurations where the remote terminal is connected directly to the switch, (i.e., FIG. 1) the unbundling apparatus is merely inserted somewhere in the channel path. Thus, all voice and control channels which were formerly attached between the remote terminal and the host switch are connected through the switch fabric, and the testing line from the remote terminal to the switch is connected through the testing module. Competitive access providers can then connect voice and control channels to the switch fabric which may then be connected to the remote terminal, and a testing line from each of the competitive access providers is connected to the remote terminal via the testing module.

The switch fabric of the unbundling apparatus connects all voice channels between the remote terminal and all service providers. It also switches the control channels between the LEC switch and the competitive access providers on the one hand and the remote terminal on the other to the command module. The command module performs any protocol translations necessary (such as TR08 to TR303). All control messages from switches are then multiplexed and sent back to the switch fabric, which routes them to the original command channel to the remote terminal. Command communications from the remote terminal (such as off-hook and alarm conditions on a line) are demultiplexed, translated (if necessary) and sent to the switch fabric for delivery to the switch that controls that particular line.

Test commands from the original LEC switch are sent via a metallic path to the testing module, which forwards them via a metallic connection to the remote terminal. Test commands from competitive access providers are also sent via new metallic paths to the testing module, and then sent through the single a metallic connection to the remote terminal.

Alternatively, in situations where the original LEG switch is connected to a remote terminal via a host digital terminal (i.e., FIG. 2), an unbundling apparatus according to this invention may be connected between the host switch and the host digital terminal. In this scenario, voice lines, control lines, and test lines are treated as described above. However, with the unbundling apparatus between the host switch and the host digital terminal, standard protocols (such as TR303 or TR08) may be used to connect competitive access provider switches to the host digital terminal without the unbundling apparatus having to translate any proprietary protocol, and without having to modify the remote terminal to understand a standard protocol.

Finally, an unbundling apparatus according to this invention may be used with a command module that translates TR303 or TR08 to proprietary protocol and, thus, may be inserted anywhere into the network using any combination of switches.

In this manner, competitive access providers may fully control specific lines on a remote terminal, providing all control functionality and test capabilities necessary to maintain a reliable remote terminal, while unbundling the remote terminal services from the original LEC switch.

BRIEF DESCRIPTION OF THE DRAWING

A more complete understanding of the invention may be obtained from consideration of the following description in conjunction with the drawings in which.

DETAILED DESCRIPTION

Figure 3:
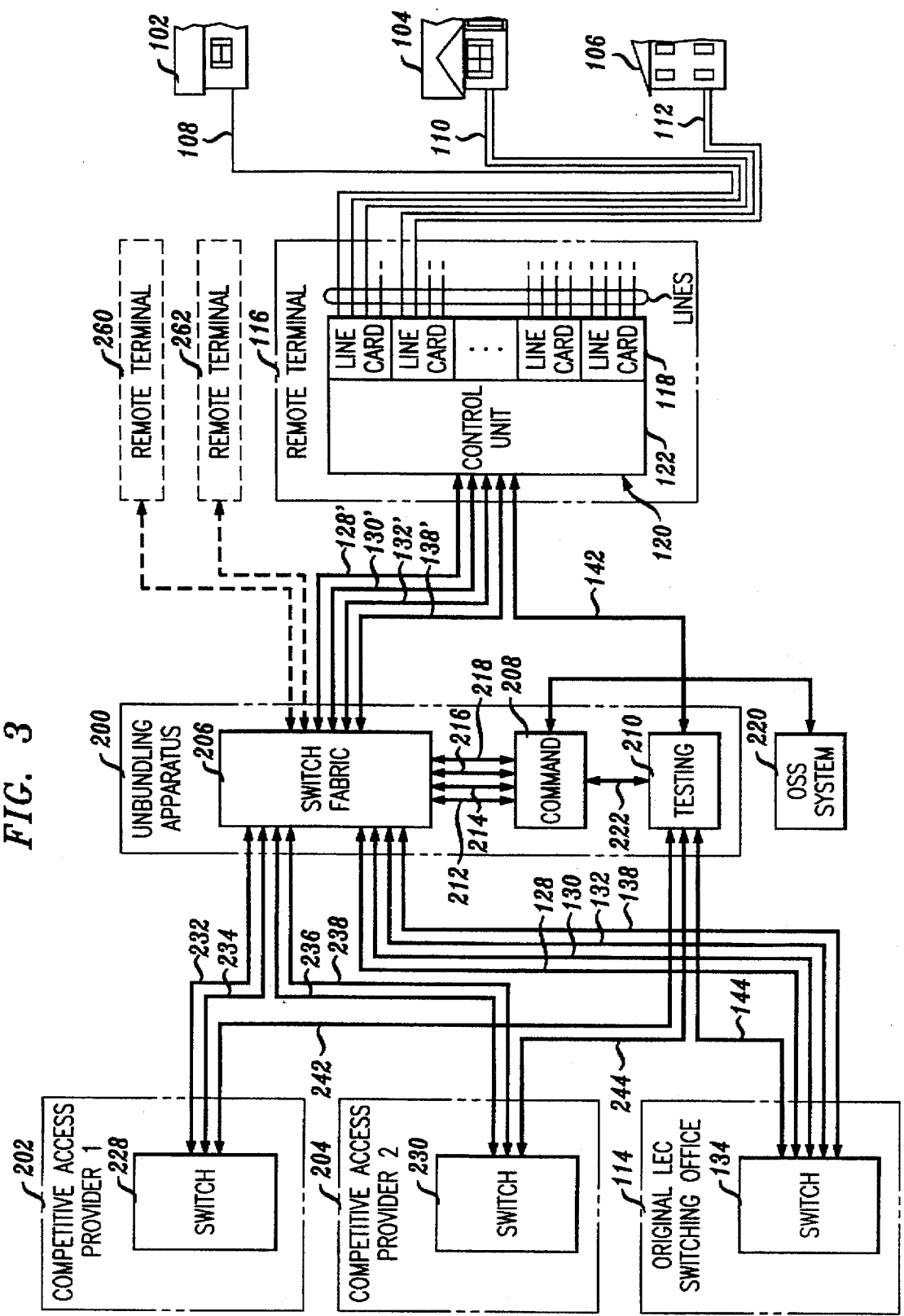
FIG. 3 is a block diagram of an unbundling system illustrating the unbundling of lines and sharing of facilities among the original LEC switch and to competitive access providers according to the prior art systems of FIG. 1.

FIG. 3 is a block diagram illustrating a first exemplary embodiment of an unbundling apparatus 200 which connects a plurality of switches 134, 202, and 204, to a remote terminal 116. As will be described in more detail below, unbundling apparatus 200 comprises three modules: a switch fabric 206, a command module 208, and a testing module 210. In this exemplary embodiment, a LEC switch 134 and competitive access provider switches 202 and 204 can communicate directly with a remote terminal using TR303 or TR08 protocol. In this exemplary embodiment, all voice, control and test channels 128, 130, 132, 138, and 144 between the LEC switch 134 and remote terminal 116 are cut, and the unbundling apparatus added. Voice and control competitive access channels of the original LEC switch 134 (128, 130, 132, and 138) and competitive access provider switch 202 (232, 234) and provider switch 204 (236, 238) are then connected to switch fabric 206, and metallic test paths 144, 242, and 244 are connected to testing module 210. Voice and control channels (128', 130', 132', and 138') from remote terminal 116 are also connected to switch fabric 206 and a metallic test bus 142 is connected to testing module 210.

Switch fabric 206, in this exemplary embodiment, comprises a DS0 switch fabric, which is connected to a plurality of DS1 inputs and outputs as known in the art. Command module 208 is connected to switch fabric 206 via a plurality of DS0 connections 212, 214, 216, and 218. Command module 208 receives command messages from both the competitive access provider switches 202 and 204 and the original LEC switch 114 via switch fabric 206. Command module 208 multiplexes command messages for remote terminal 116 and forwards them via one of the DS0s 212–218 back to switch fabric 206 switches them onto command channel 138'. Command module also receives control messages and alarm messages from remote terminal 116, and send them to the switch that controls that line.

Advantageously, command module 208 performs any translation necessary from the native command set of competitive access provider switches 202 and 204 into the command language that control unit 202 of remote terminal 116 is expecting (usually TR303 to TR08 or vice-versa). Command module 208 is also connected to an operating service and support system (OSS) 220, which may remotely control remote terminal 116 for maintenance and other functions currently provided by the OSS system in the prior art and, thus, will not be discussed further.

Testing module 210 is connected to original LEC switch 114 via metallic test bus 144 and connects tests that originate with original LEC switch through bus 142 to remote terminal 116. Test requests originating from competitive access provider switches 202 and 204 are sent to test module 210 via metallic test buses 242 and 244 and multiplexed together with test requests from LEC switch 134 so that they appear to remote terminal 116 as if all test requests were from LEC switch 134. Results are reported back through testing unit 210, demultiplexed, and delivered to the appropriate switch.

Each competitive access provider switch 202 and 204 may be connected to other remote terminals or other competitive access remote terminals. In this exemplary embodiment, competitive access provider switch 202 is connected to the switch fabric 206 of unbundling apparatus 200 via trunks (DS1s) 232 and 234 and competitive access provider switch 204 is connected via trunks (DS1 s) 236 and 238. In this manner, unbundling apparatus 200 may provide competitive access telephone service providers access to one or more remote terminals which may be serving a plurality of lines.

Thus, each subscriber 102–106 may select one among the service providers 114, 202, and 204, according to need, desire, cost, or other considerations. Furthermore, unbundling apparatus 200 may be located anywhere in the network, i.e., at the remote terminal 116, at the original LEC switch 114, or anywhere in between; as long as competitive access provider 202 and 204 can physically make the connections to unbundling apparatus 200. Finally, unbundling apparatus may be connected to more than one remote terminal, such as 262 and 264 (up to the capacity of switch fabric 206). Thus, a flexible system for providing competitive access, that is unbundling, of one or more remote terminals is shown.

Figure 1:
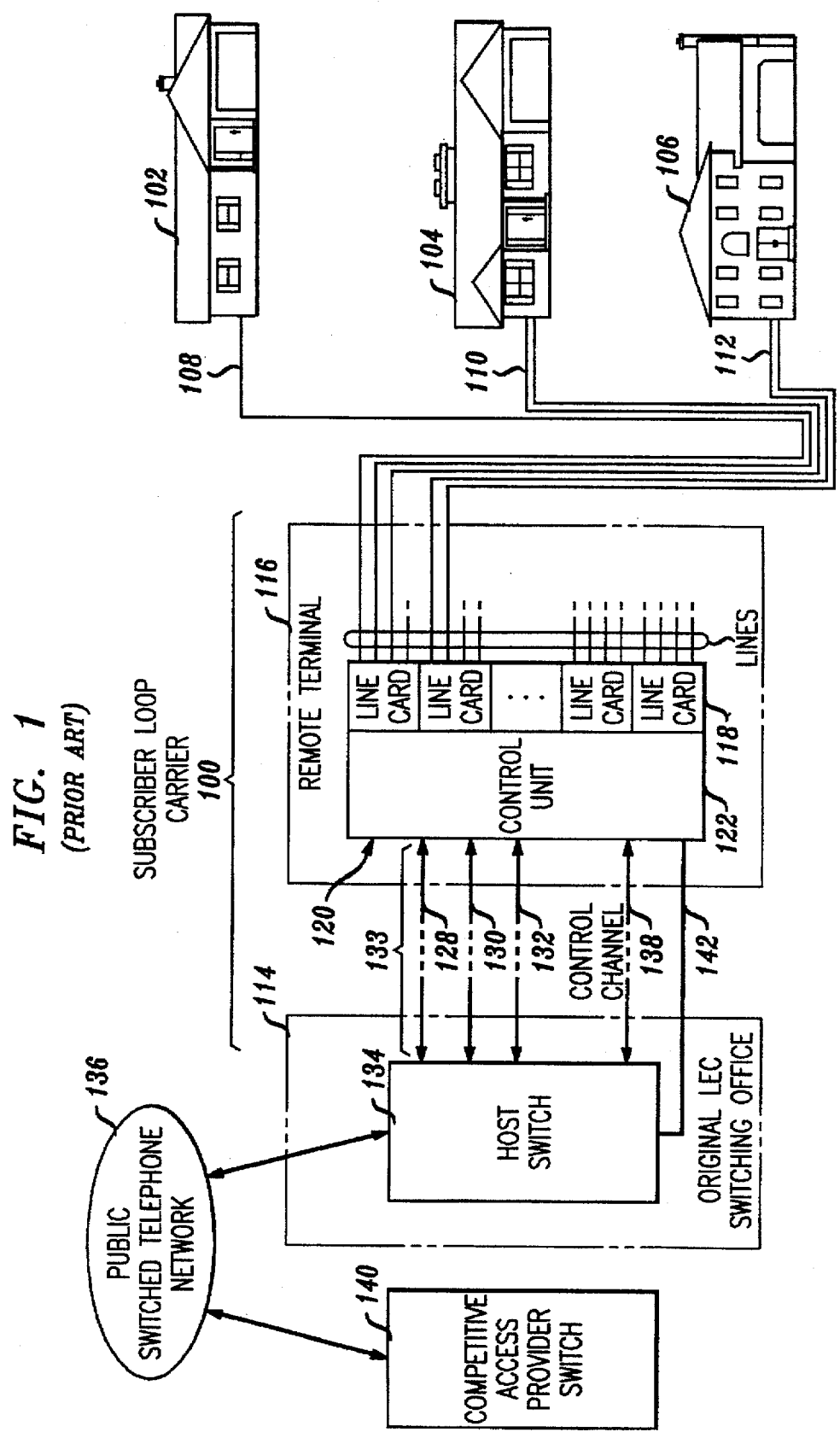
FIG. 1 is a block diagram of a prior art SLC system and its connection to the public switched telephone network.
Figure 2:
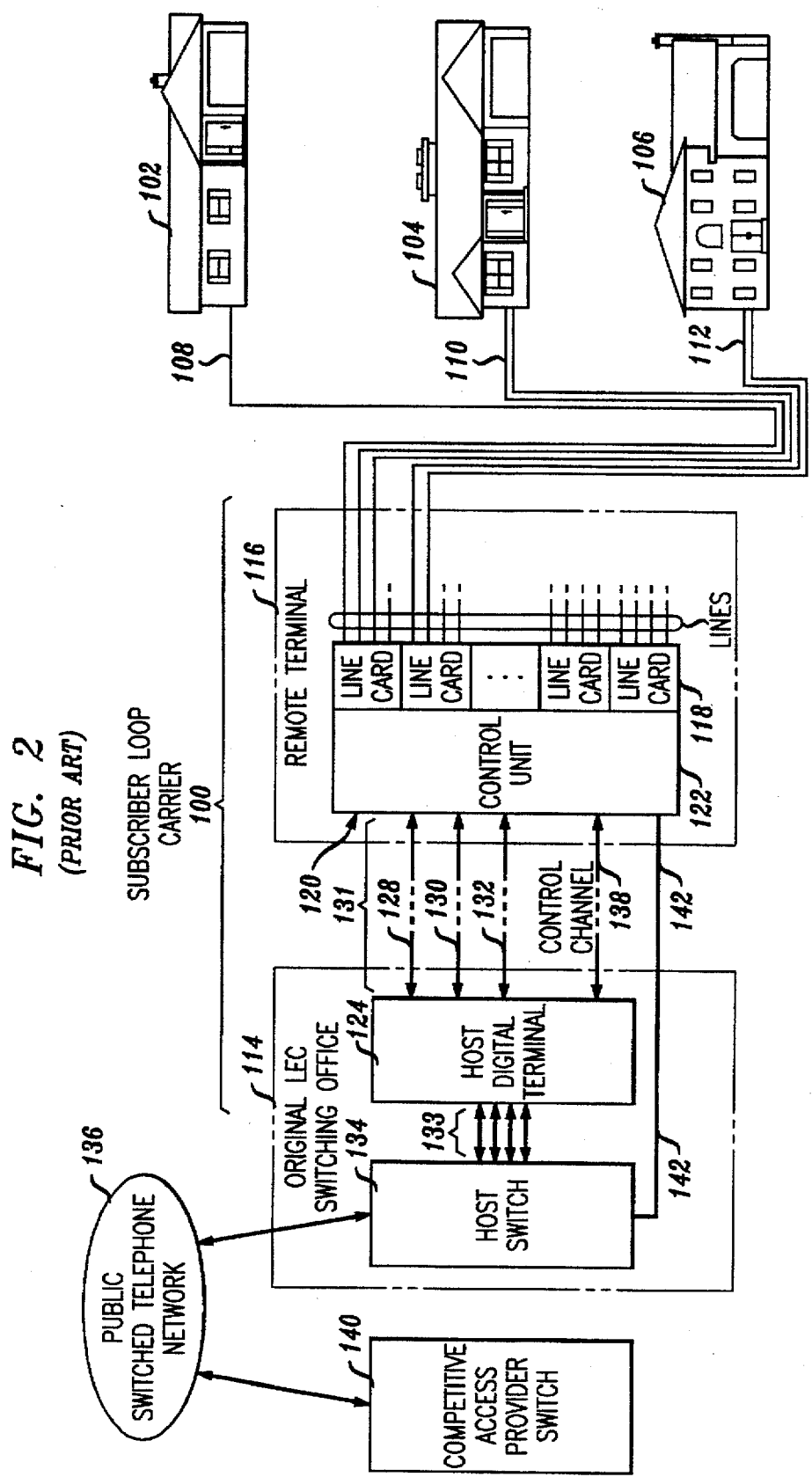
FIG. 2 is a block diagram of a different prior art SLC system and its connection to the public telephone network.
Figure 4:
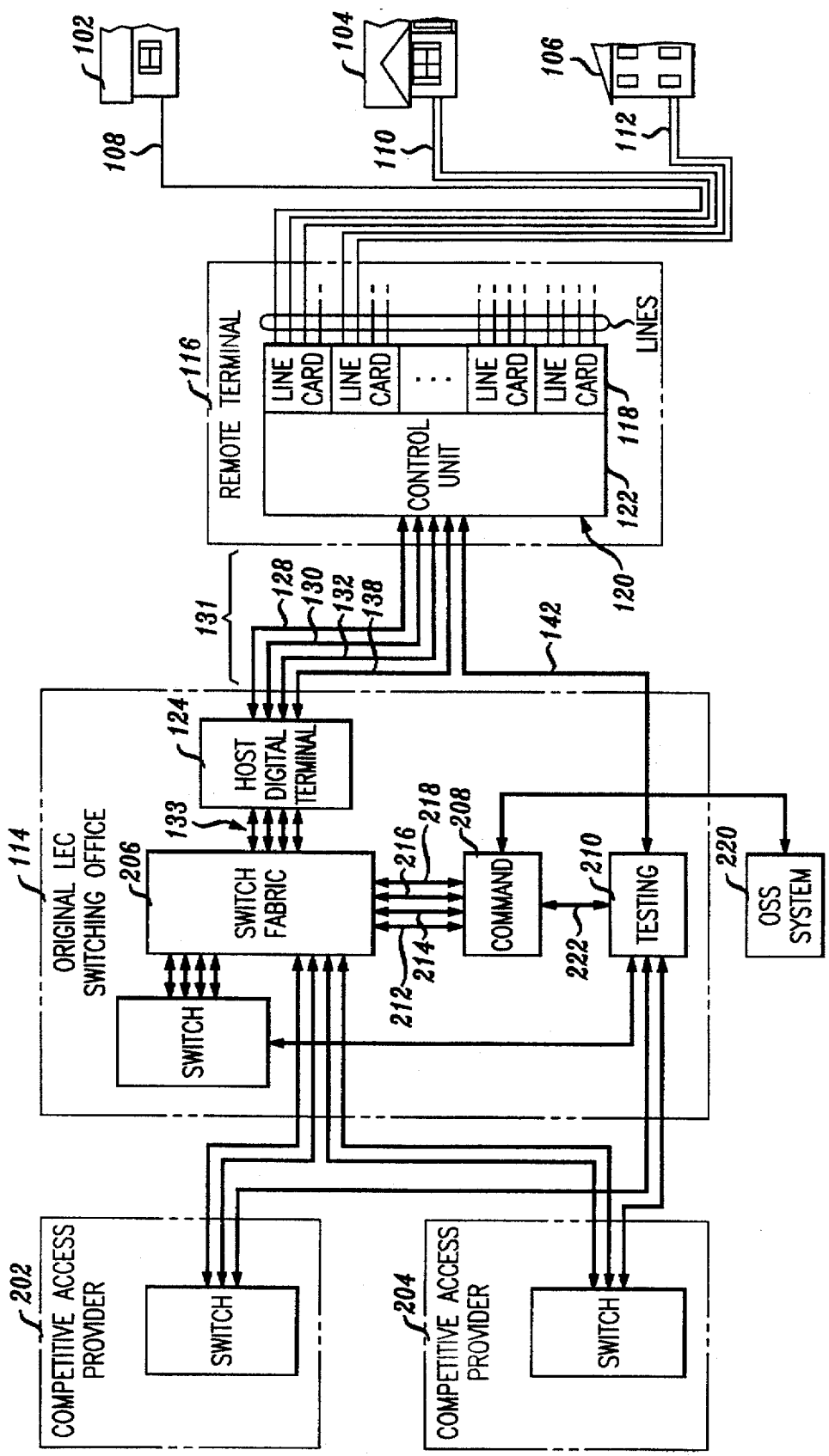
FIG. 4 is a block diagram of an unbundling system used in conjunction with the SLC system of FIG. 2.

Turning now to FIG. 4, the use of an unbundling apparatus in the prior art configuration illustrated in FIG. 2 is shown. Returning briefly to FIG. 2, it is noted that there is a proprietary protocol 131 between host digital terminal 124 and remote terminal 116. However, there is a standard interface using TR303 or TR08 between host switch 134 and host digital terminal 124 via a plurality of links 133. In the embodiment of FIG. 4, unbundling apparatus 200 is connected between switch 124 and host digital terminal 124. At this point, other competitive access provider switches such as 202 and 204, which can communicate via TR303 or TR08, can then be simply and efficiently connected to switch fabric 206 and test module 210. The main difference between this configuration and the configuration described above in connection with FIG. 3 is that the unbundling apparatus must be located within the original LEC switching office 114 so that a common protocol (i.e., TR303) may be used among all switches. Thus, in the configuration of FIG. 4, proprietary interface 131 is preserved between host digital terminal 124 and remote terminal 116.

Figure 5:
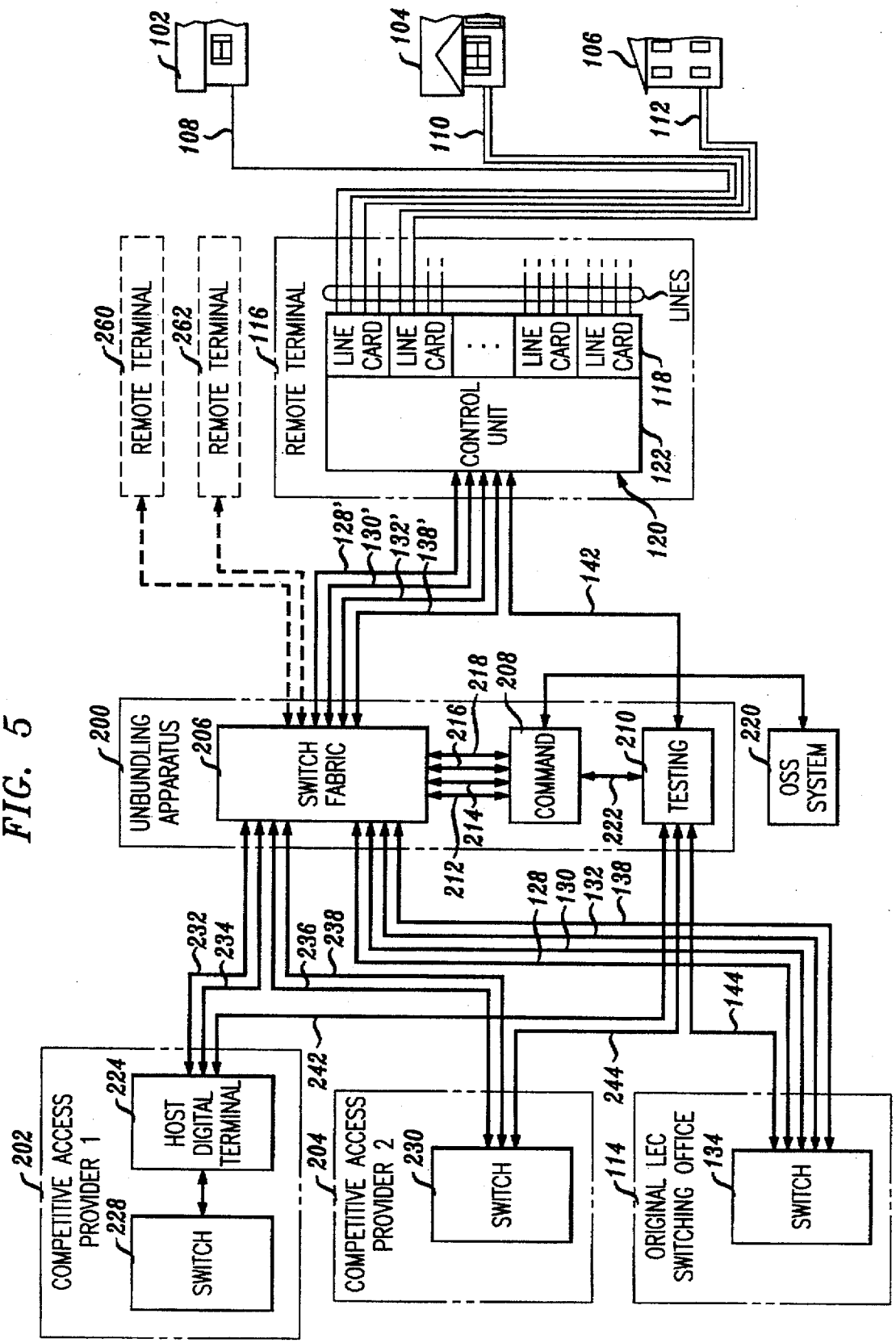
FIG. 5 is a block diagram of an unbundling system that performs protocol conversion used in conjunction with the systems of FIGS. 1 and 2.

Turning now to FIG. 5, a further embodiment of unbundling apparatus 200 is shown. In this exemplary embodiment, there is a mixture of switches wherein original LEC switch 134 and competitive access provider 204 have switches which communicate directly with remote terminal 116 in TR303 or TR08 protocol. However, competitive access provider switch 202 includes host digital terminal 224, which uses a proprietary protocol over trunks 232 and 234. In this case, when a command or communication is received over trunk 232 or 234, it is switched through switch fabric 206 through one of connections 212-218 into command module 208. Command module 208 in this exemplary embodiment is programmed to translate between the proprietary interface as understood by host terminal 224 and TR303 or TR08. In this manner, all of the unbundling apparatus 200 may provide competitive access in nearly every configuration, depending upon the translation program in command module 208.

Figure 6:
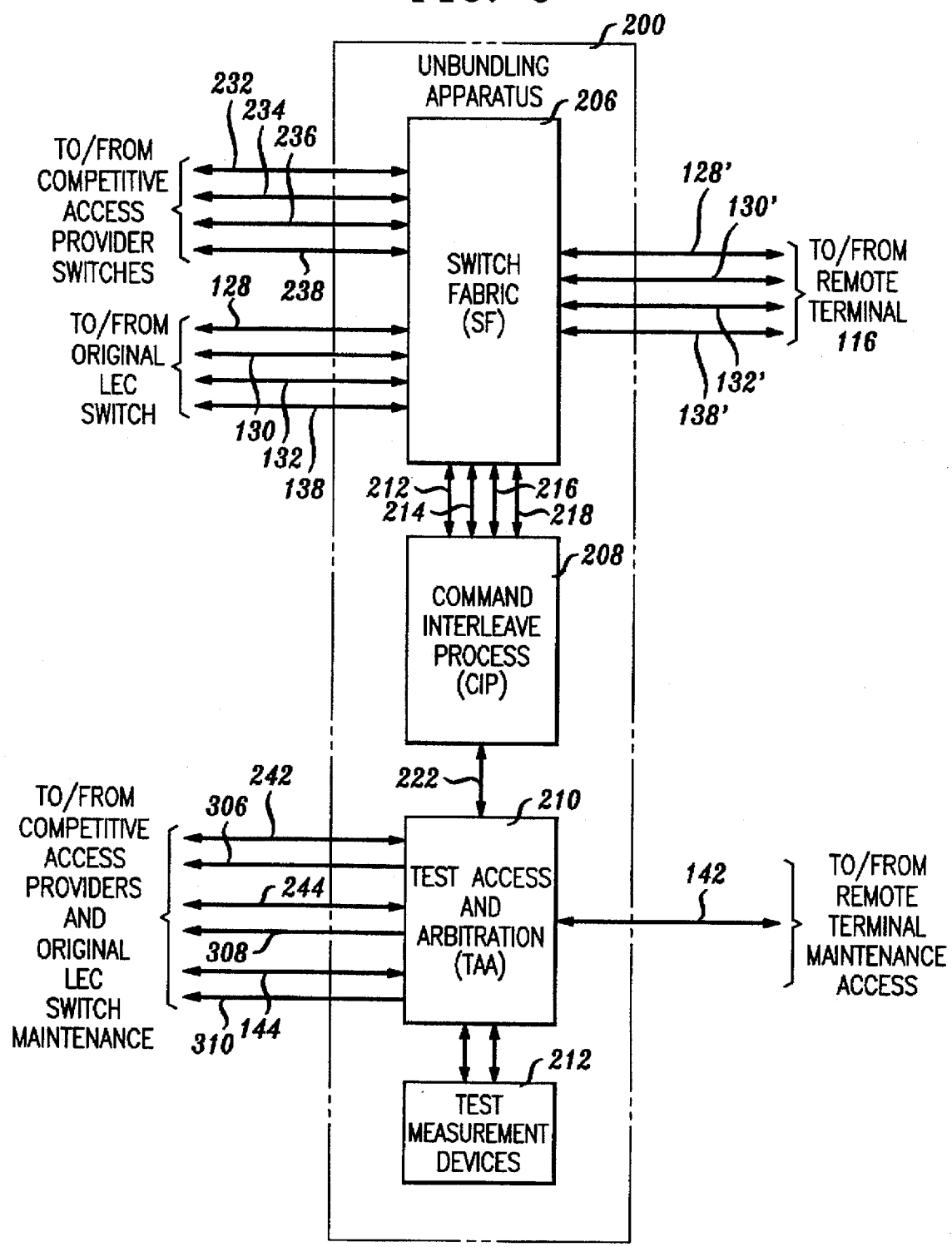
FIG. 6 is a more detailed description of the unbundling system of FIGS. 3, 4, and 5.
Figure 7:
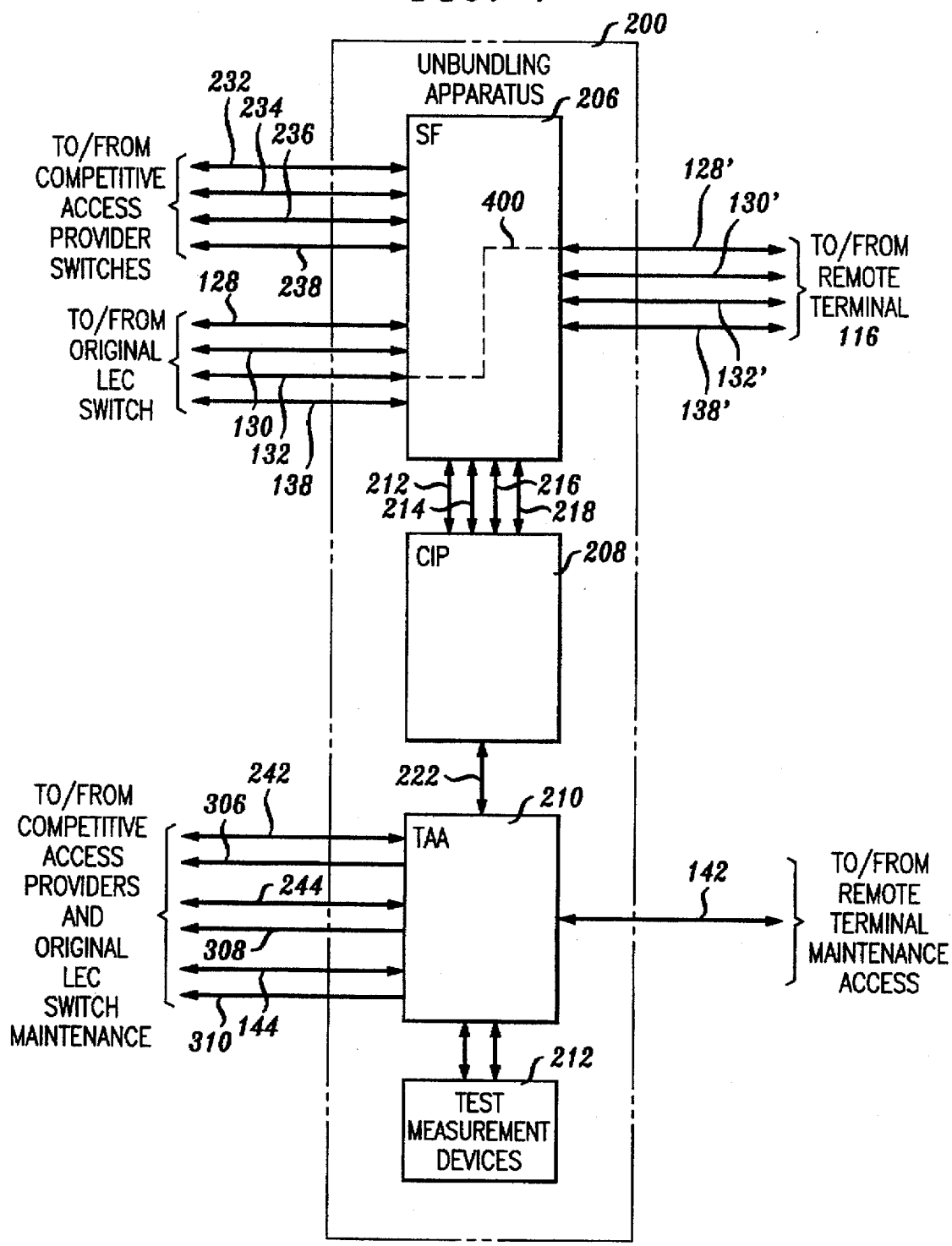
FIG. 7 is an example of the routing of a voice channel from the original LEC switch to the remote terminal.

Turning now to FIG. 6, a more detailed block diagram of unbundling apparatus 200 is shown. Switch fabric 206 of unbundling apparatus 200 comprises a DS0 switching fabric, which, as known in the art, connects to a plurality of DS1s. Switch fabric 206 performs basic grooming functionality, that is, separating each DS0 pair and providing routing, etc., as is known in the art. Switch fabric 206 could be any form of fabric which can switch individual units of multi-unit trunks.

In this embodiment, switch fabric 206 is connected to competitive access service switches via DS1s 232, 234, 236, and 238. As stated above, there may be one or more competitive access service providers connected to switch fabric 206, up to the capacity of switch fabric 206, without departing from the scope of this invention. Switch fabric 206 is connected to remote terminal 116 via DS1s 128', 130', 132', and command channel 138' (in the configuration of FIG. 4 switch fabric 206 is connected to host digital terminal via 128–138). By these connections, the DS1s and command channels that are normally connected between a remote terminal and the original LEC switch are still provided with one connection into the unbundling apparatus 200, as if it were directly connected. Also, switch fabric 206 can terminate DS1s from more than one remote terminal such as remote terminals 260 and 262, and translate voice channels from such multiple remote terminals to appear as one remote terminal to a competitive access provider switch, thus, providing improved utilization of the competitive access provider resources. Thus, nothing at the remote terminal(s) connected to an unbundling apparatus according to this invention needs to be modified in order to unbundle access to such remote terminals.

Switch fabric 206 also has DS0 connections to the command module, or command interleave process 208. Switch fabric 206, as will be discussed below, has connections to the original LEC switch via DS1s 128, 130, and command channel 138, as in the prior art, so that the original LEC switch need not be modified in order to unbundle remote terminal access to individual lines. Most importantly, command interleave process 208 multiplexes/demultiplexes command messages to and from all of the service providers and the remote terminal, and sends such command messages back through switch fabric 206. Switch fabric 206 then sends such command messages to the appropriate command channel.

Command interleave process 208 performs any conversion necessary from any form of remote command interface language (which may be used by competitive access providers 202 and 204) to the original command language of LEC switch 114, so that it appears to the remote terminal as if such commands originate from one some. Command module 208 also translates competitive access providers virtual remote terminal names to the appropriate remote terminal if more than one remote terminal is connected to device 200. Thus, command module may translate TR303 to TR08, the reverse, or any proprietary interface language to TR303 or TR08, depending upon its programming.

Test access and arbitration unit (TAA) 210 provides test access to and from the remote terminal via trunk 142 (for remote terminal 116 shown, and additional buses if more than one remote terminal is connected to device 200) to and from LEC switch via 144, 242 for switch 204, and 244 for switch 202. Test access and arbitration unit 210 then arbitrates among the switches wishing to run tests, allowing one test at a time to the remote terminal 116 maintenance access via trunk 142 and simultaneously testing the other remote terminals, if so equipped (generally, one test at a time per remote terminal). Test access and arbitration unit 210 also has a plurality of inhibit lines 306, 308, and 310, which are connected to each switch in order to prevent the switches from preempting tests in progress or maintenance activities on remote terminal 116. Test access and arbitration unit 210 is connected to test measurement devices 212, as are known in the art. These test measurement devices 212, normally provided on a switch, allow competitive access service providers access to test measurement devices that tests this particular brand of remote terminal 116, even if the competitive access provider switch is not made by the same manufacturer.

Thus, through use of switch fabric 206, command interleave process 208 and test access and arbitration unit 210, each switch is provided access to lines on remote terminal 116, may send and receive commands to control such lines, and are all provided access to test mechanisms for remote terminal 116, without having to change any protocols in the existing LEG remote terminal, LEC switch, or competitive access providers. This invention provides an economical and simple method for unbundling remote terminal 116 from the original LEC switch, and provides competition at the local service level with a minimal amount of disruption of operation of pre-existing hardware.

FIGS. 7–12 illustrate various connections through unbundling apparatus 200 in order to show how connections are made through this system. Turning first to FIG. 6, FIG. 6 illustrates a voice path to/from the original LEC switch connected to/from remote terminal 16. The voice path 400 is set up on one of the DS0s of DS1 132, for example, and delivered from original LEC switch 114 to the switch fabric 206. SF 206 connects this DS0 to one of the plurality of DS0s in one of the DS1s connected to a remote terminal 116, which, in this example, is connected through DS1 130' to remote terminal 116.

Figure 8:
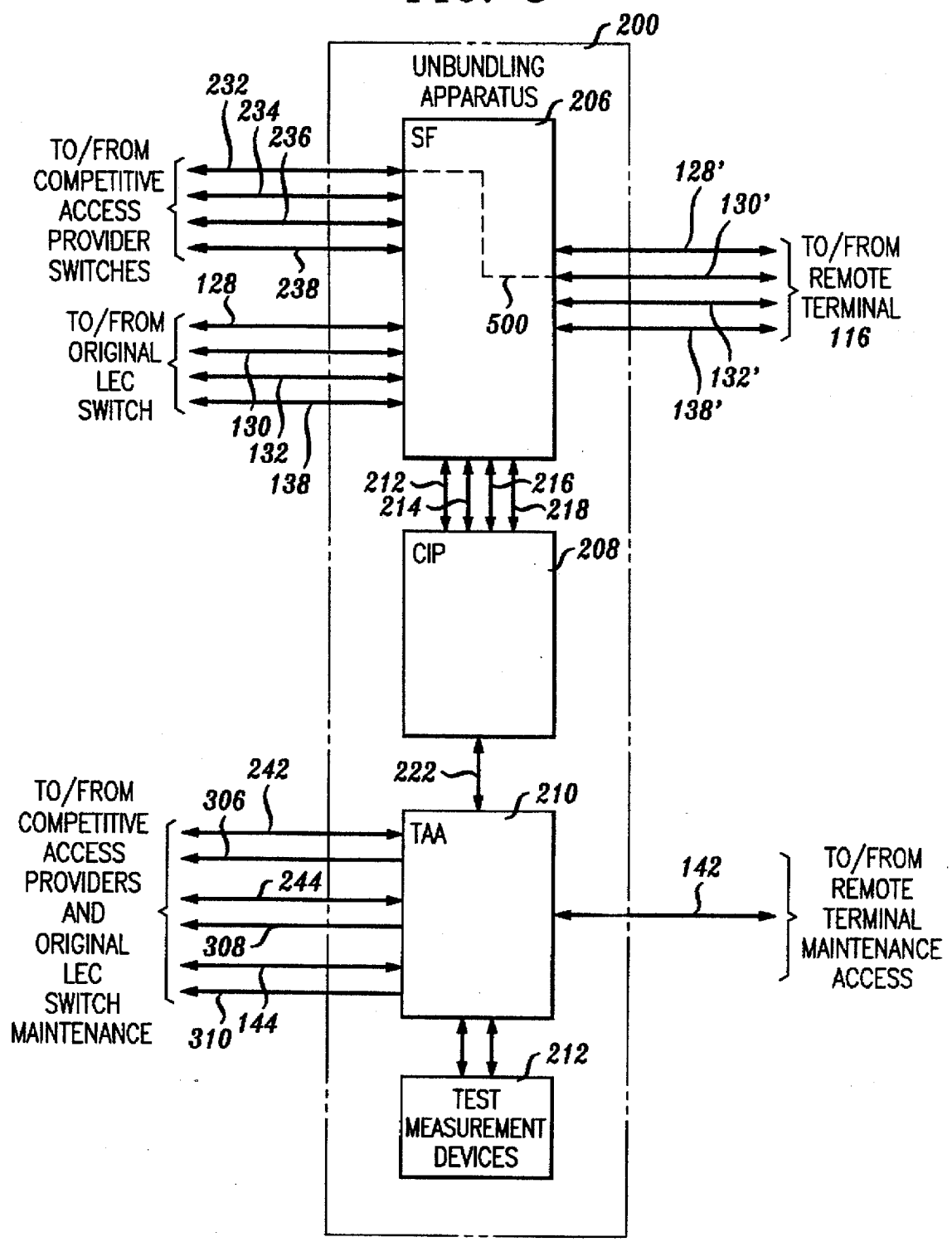
FIG. 8 is an example of a competitive access provider routing of a voice channel to the remote terminal.

Turning now to FIG. 8, an example of a competitive access service provider voice path connected to and from a remote terminal is illustrated. In this scenario, a call arriving from a competitive access service provider switch, i.e., switch 202 on DS1 232, is groomed and sent through the switch fabric 206 via path 500 to one of the voice channels attached to remote terminal 116, in this instance DS1 130'. Direct connections can thus be made between competitive access providers and remote terminal 116 which appears as if the competitive access provider were originally attached to the remote terminal 116.

Figure 9:
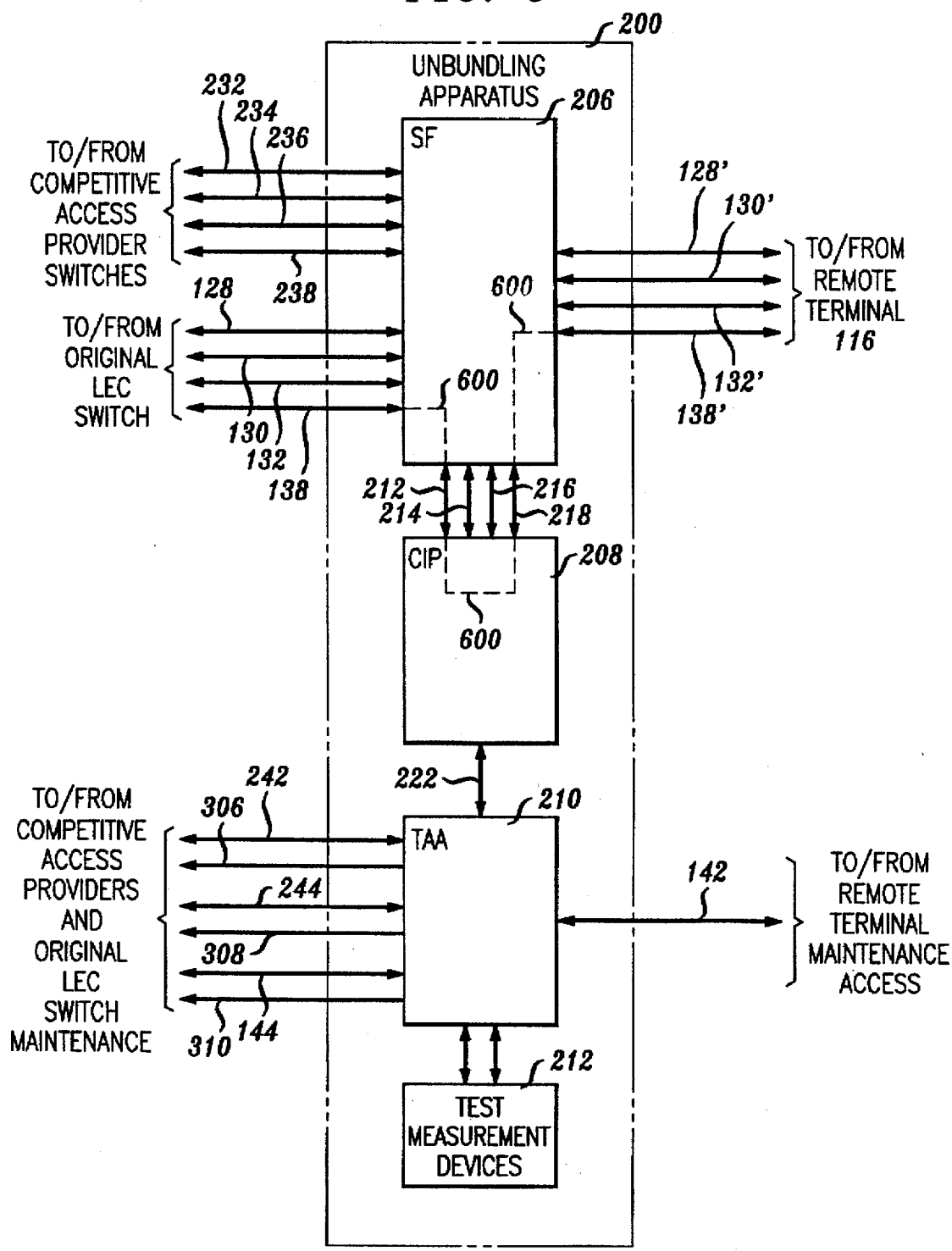
FIG. 9 is an example of a command from a LEC switch to the remote terminal.

Turning now to FIG. 9, an example of a command connection between the original LEC switch and the remote terminal is shown. A path 600 is set up between the control channel 138 emanating from the original LEC switch through to control channel 138' which connects to the controller of the remote terminal 116. Such a connection appears as if it originated as if there were no unbundling apparatus 200 between the original LEC switch and the remote terminal 116. In this scenario, commands from channel 138 are delivered to CIP 208. These commands (having originated from the original LEC switch) do not need to be translated and thus as sent through switch fabric 206 to the CIP 208 back through a connection the switch fabric 206 in order to be connected to control channel 138'.

Figure 10:
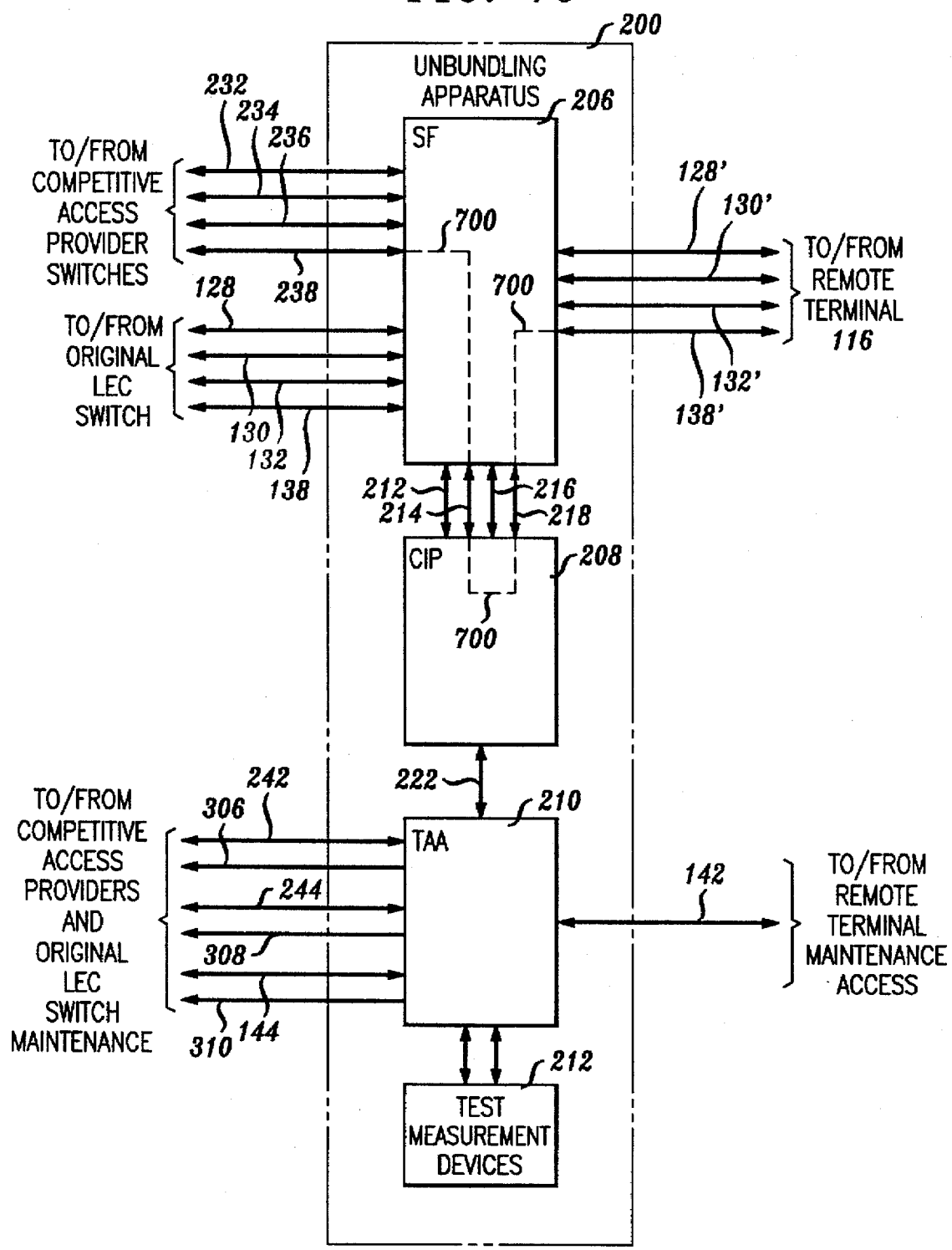
FIG. 10 is an example of the routing of a command from a competitive access provider to the remote terminal.
Figure 11:
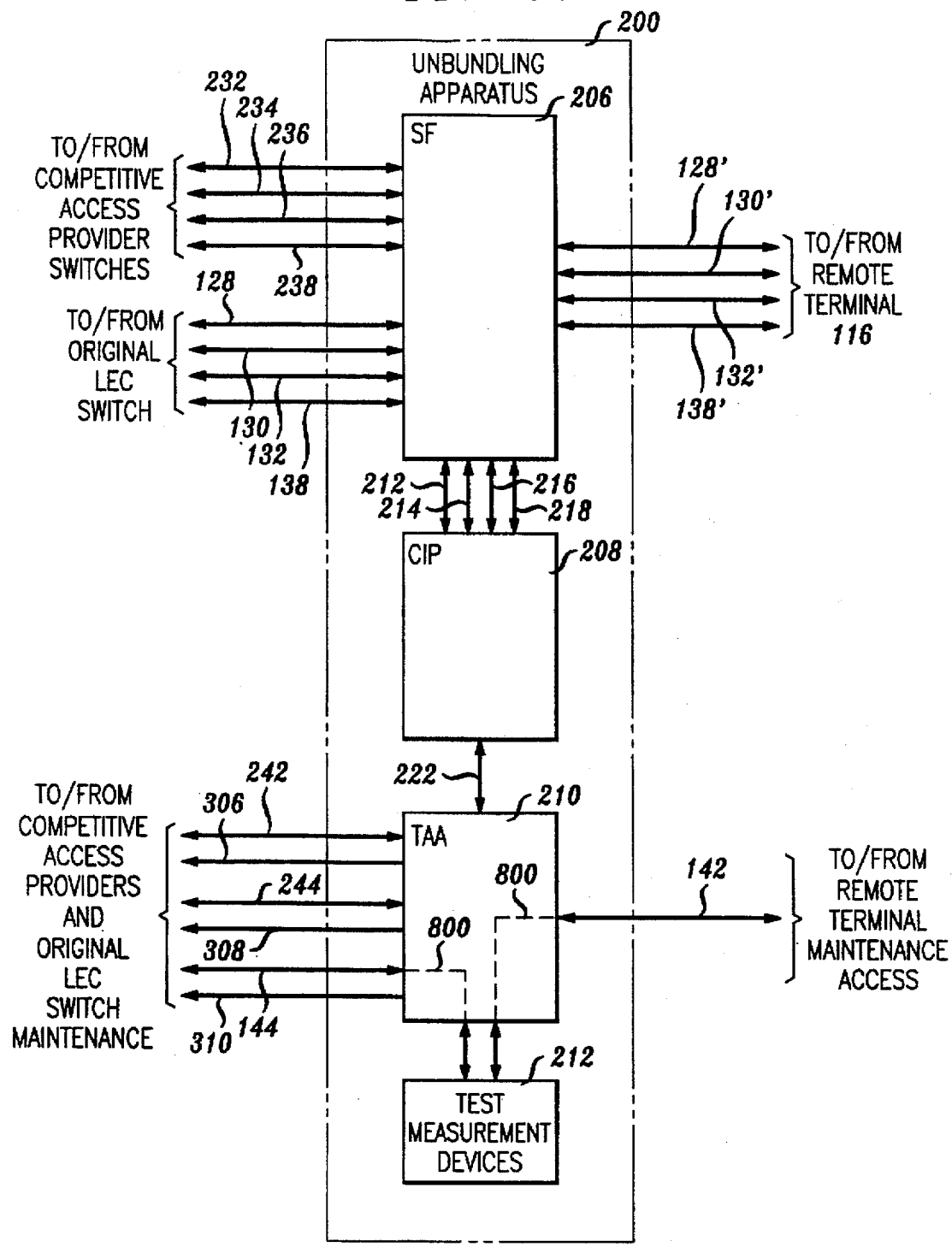
FIG. 11 is an example of the maintenance request from a LEC switch to the remote terminal.

Turning now to FIG. 10, a path for a competitive access provider command to remote terminal 116 to control or receive information from terminal 116 is illustrated. In this scenario, competitive access provider switch 204 sends and/or receives a command via 1 channel of DS1 238 which is received at switch fabric 206. Switch fabric 206 grooms the channel pair and sends the command via path 700 into CIP 208. CIP 208 performs any translations of commands according to any of the protocols (see FIG. 13 and the accompanying text) through a multiplexer and sent via path 700 to switch fabric 206 where it is sent through command channel 138' to the remote terminal. In this manner, competitive access providers (and remote terminals) merely send and receive command in their native command language and all conversion is performed in the conversion interface process 208.

Commands are multiplexed in CIP 208 and sent on a command channel to remote terminal 116. Further, commands from other competitive access provider switches in the original LEC switch are multiplexed on the same channel. Thus, from either end point of view, unbundling apparatus 200 gives the appearance of the remote terminal 116 being directly connected to any switch connected to the unbundling apparatus 200.

Turning to FIG. 10, the original LEC switch 114 performs a test on path 800 via bus 144 as it did in the prior art. Such tests are received at the test access and arbitration (TAA) 210 device. Such tests may be connected through test measurement devices 212 in order to access testing tools formerly provided at the original LEC switch 114. The test measurement device 212 is then connected via path 800 to test bus 142 which makes a test communication to remote terminal 116. The results are measured in test measurement devices 212 and the compiled results sent back on path 800 through bus 144. Thus, the LEC switch sends tests and receives results in the same manner and appearance as known in the art today.

Figure 12:
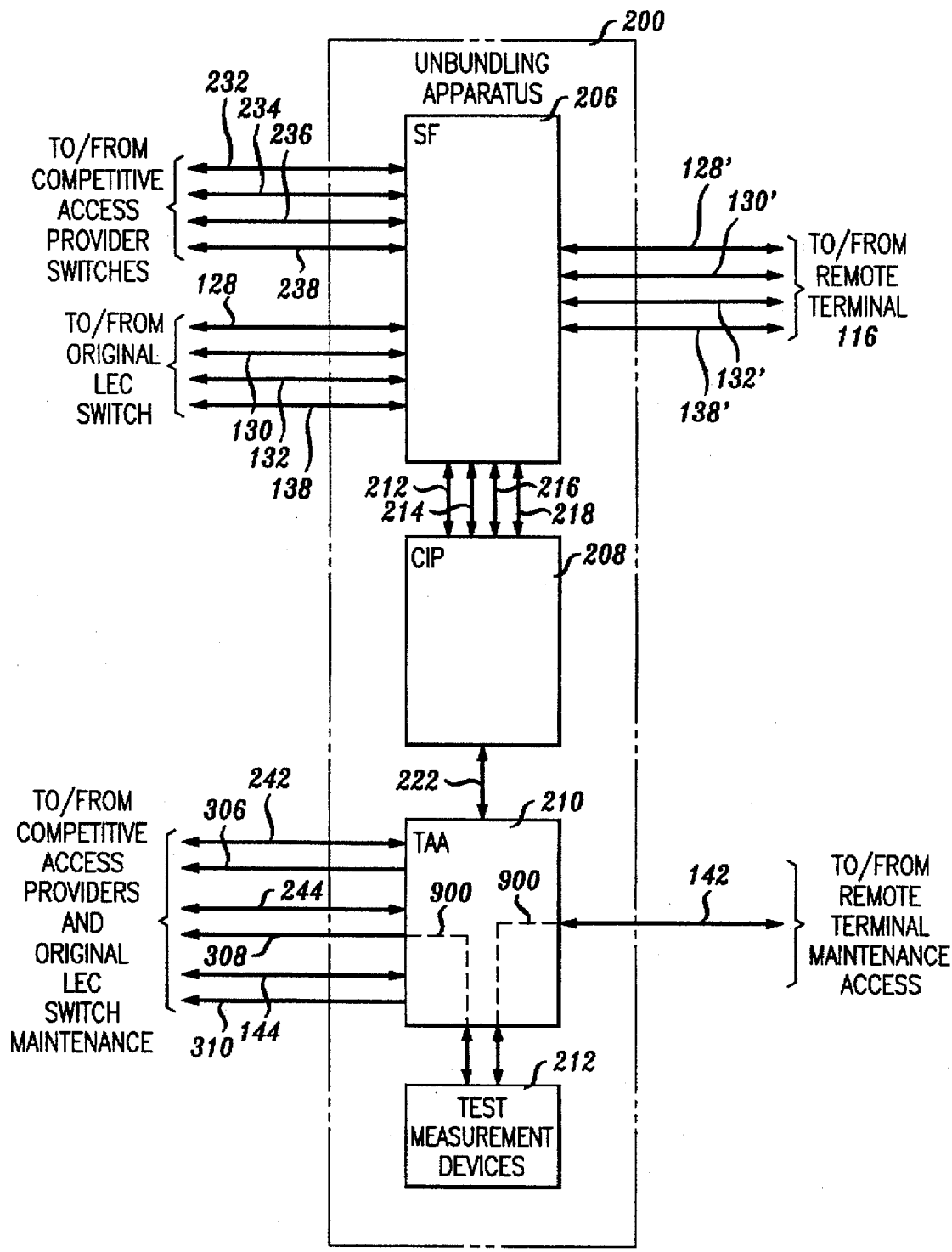
FIG. 12 is a diagram illustrating the connection between a competitive access provider switch and the maintenance access of a remote terminal.

Turning now to FIG. 12, control of remote terminal maintenance access from a competitive access provider switch is illustrated. In this scenario, competitive access provider switch 202 makes a test connection to TAA 210 via test bus 242. TAA 210 then sets up path 900 through one of the plurality of channels through test measurement devices 212 if necessary and then from test measurement devices 212 through a continuation of path 900 through remote terminal maintenance bus 142 to remote terminal 116. In this manner, competitive access provider switches have full capabilities of performing routine maintenance on lines and/or line cards channels etc., that are under the control of the competitive access provider switches.

Figure 13:
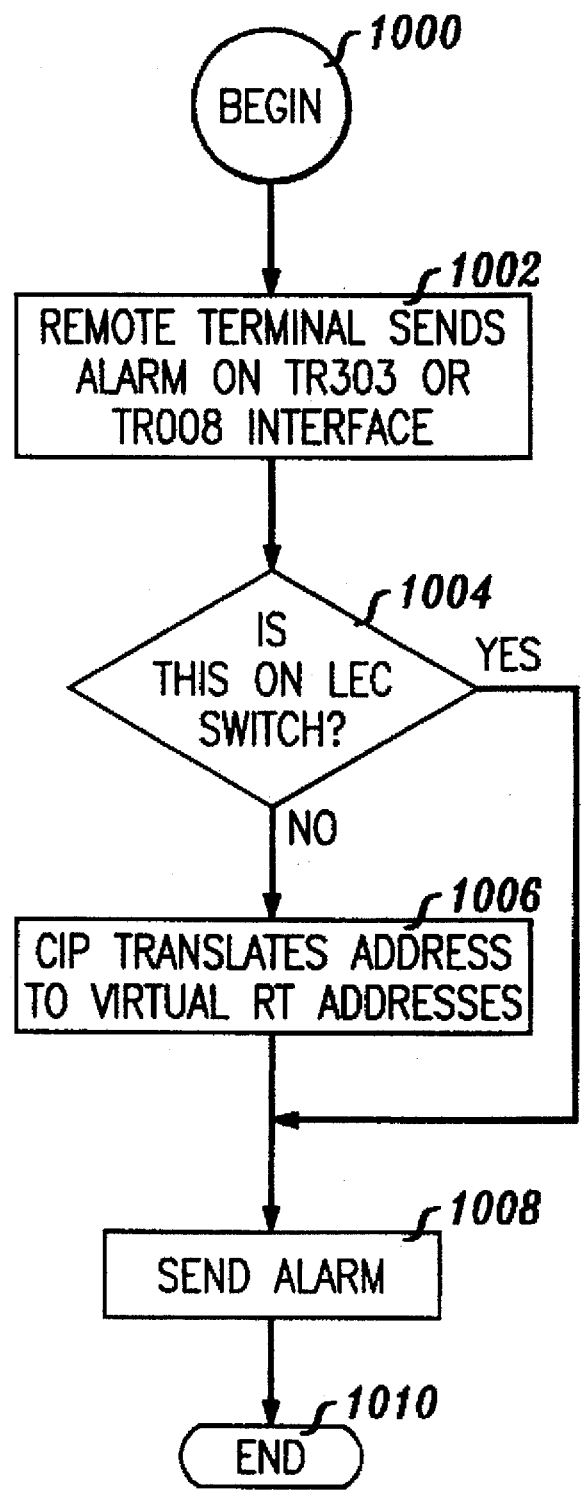
FIG. 13 is a flow chart of operations in the testing access and arbitration portion of the unbundling system according to this invention.

Turning now to FIG. 13, a flow chart of control is illustrated. In this example, an alarm is coming over maintenance channel 142 from remote terminal 116, but this flow of control is applicable to command messages flowing in both directions. Operations begin in circle 1000 and proceed to action block 1002, where remote terminal sends an alarm using one of a plurality of interface messages (herein TR303 or TR08, which are well-known in the art or even a proprietary interface). Processing continues to decision diamond 1004 where a determination is made if this is an alarm associated with the LEC switch. If it is not, then processing continues to action blocks 1006 where the CIP translates the address address for one of the competitive access provider switches 202 and 204. If the address is on the LEC switch 114, and after action box 1006, processing continues to action blocks 1008, where the alarm is sent to its respective destination. Processing ends in box 1010.

Figure 14:
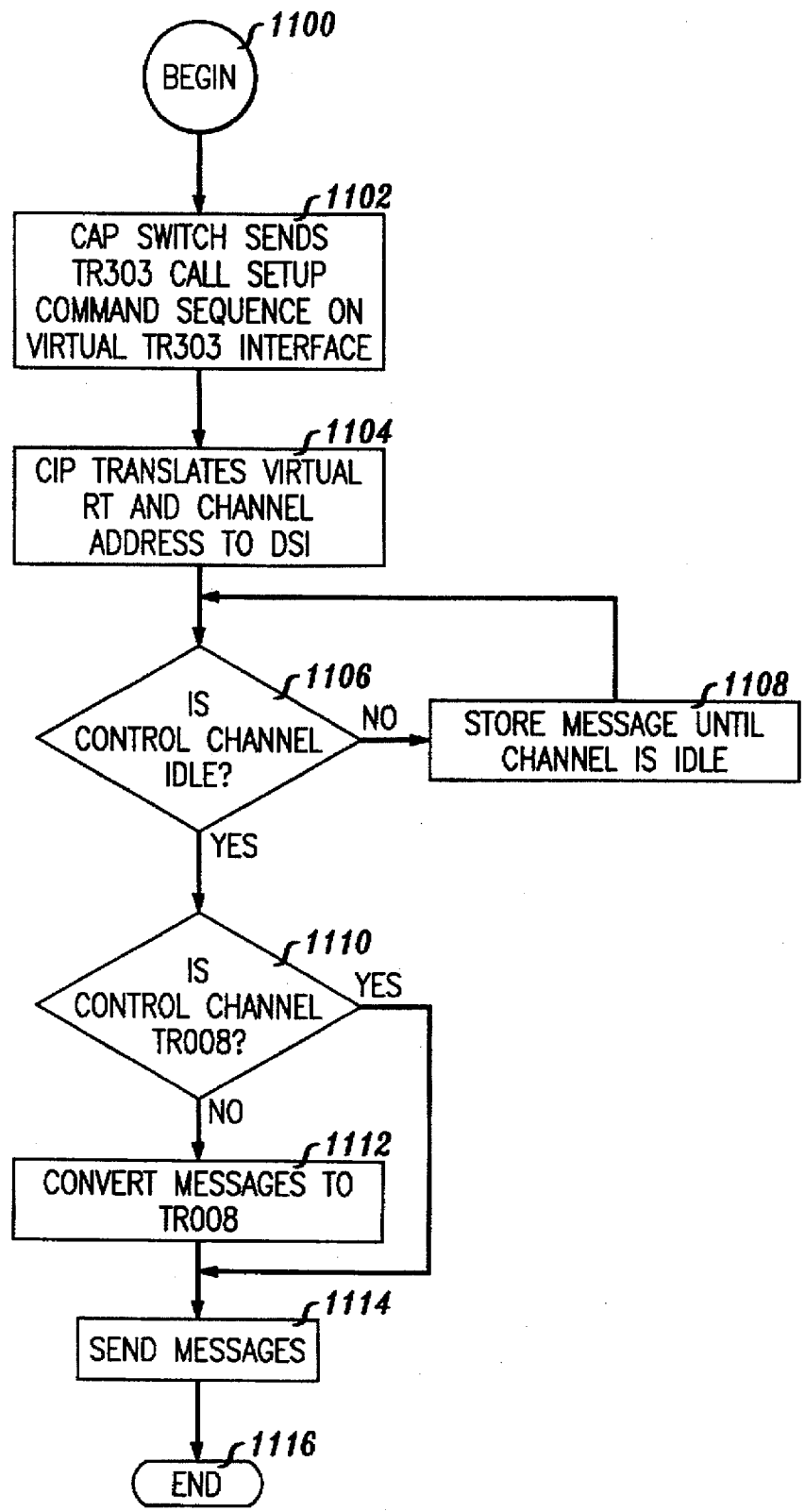
FIG. 14 is a flow chart illustrating the flow of control in the command interleave process portion of the unbundling apparatus according to this invention.

FIG. 14 illustrates processing a control message from a competitive access provider switch to the remote terminal. Processing begins in circle 1100 and proceeds to action block 1102, where the competitive access provider switch sends a call set up command, for example, in TR303 sequence on a virtual TR303 interface. Processing continues to action blocks 1104 where the CIP 208 translates the virtual remote terminal address and channel address to a specific DS1 address on remote terminal 116. Processing continues to decision diamond 1106, where a determination is made if the control channel is idle. This action is taken as a form of arbitration in order to keep the remote terminal from being flooded with messages. If the control channel is not idle, then the message is stored until the channel is idle in action blocks 1008.

If in decision diagram 1106 the control channel is idle, then a determination is made if the control channel uses TR008 in decision diamonds 1110. If the control channel does not use TR008, then in action blocks 1111 and 1112, messages converted to TR008. Processing continues from box 1112 and decision diamond 110 yes branch to action blocks 1114 where the messages are send over the control channel to the remote terminal. Processing ends action box 1116.

It is to be understood that the above-described embodiment is merely and illustrative principle of the invention, in that many variations may be devised by those skilled in the art without departing from the scope of this invention. It is therefore, intended that such variations be included in the scope of the claims.

The invention claimed is:

1. An unbundling apparatus for connecting a plurality of switches to a plurality of remote terminals, said remote terminals being connected to a plurality of customer lines, said apparatus comprising:

switching means for providing connections between said plurality of switches and said plurality of remote terminals;

command means connected to said switching means for receiving control messages from said plurality of switching means, multiplexing said control messages, and forwarding said control messages to one of said plurality of remote terminals, and for receiving control messages from said plurality of remote terminals, demultiplexing said control messages, and causing said control messages to be delivered to ones of said switching means via said switching means; and testing means connected to said plurality of switching systems and said plurality of remote terminals for receiving test requests from said plurality of switching systems and forwarding said test requests to ones of said remote terminals, and receiving results from said plurality of remote terminals and forwarding said test results to the requesting switching system.

2. An apparatus according to claim 1 wherein said command means further includes means for translating command messages into a protocol expected by the remote terminal.

3. An apparatus according to claim 2 wherein said means for translating translates between a first communication, control and maintenance protocol and a second control and maintenance protocol.

4. An apparatus according to claim 2 wherein said means for translating translates between a proprietary protocol language and a communication control and maintenance protocol.

5. An apparatus according to claim 2 wherein said means for translating translates between a proprietary protocol language and a control and maintenance protocol.

6. An apparatus according to claim 1 wherein said testing means includes measurement means for providing testing capabilities.

7. An apparatus according to claim 1 wherein said switching means switches DS0s.

8. An apparatus according to claim 1 wherein said switching means includes means for grooming control messages and delivering said control messages to said command means.

9. A method for use in a telephone network for providing service to a plurality of telephone subscribers connected to a remote terminal by a plurality of competing service providers, each of said competing service provider having its own switching system, said telephone network including an unbundling apparatus connected between said remote terminal and said plurality of switching systems, said unbundling apparatus comprising a switching network, and a command module, said method comprising the steps of:

said switching network connecting voice channels between said plurality of switching systems and said remote terminal;

said switching network connecting control channels to said command module;

said command module multiplexing commands from said plurality of switching systems to said remote terminal and sending said multiplexed commands to said remote terminal, and said command module demultiplexing commands from said remote terminal and sending said command to one of said plurality of switching systems, so that said telephone network can provide telephone service to any of said telephone lines connected to said remote terminal through any of said plurality of competitive switching systems.

10. A method according to claim 9 wherein different communication protocols are used by said remote terminal and one or more of said plurality of switching systems, said method further including the step of: said command module translating control messages from the protocol of the source to the protocol of the destination.

11. A method according to claim 9 wherein said unbundling device includes a test module which is connected to all of said plurality of switching systems and said remote terminal, said method including the steps of:

receiving a test command at said test module from a requesting one of said plurality of switching systems;

said test module forwarding said test command to said remote terminal; and responsive to receiving a result of said test, said test module forwarding said result to said switching system requesting said test.

12. A method according to claim 11 further including the step of:

said test module determining if a test is in progress when it receives a test request and storing said test request if there is a test in progress.

* * * * *